US006606093B1

(12) United States Patent
Gossett et al.

(10) Patent No.: US 6,606,093 B1
(45) Date of Patent: Aug. 12, 2003

(54) METHOD AND APPARATUS FOR ANTIALIASING BY GAMMA CORRECTED AREA CALCULATION

(75) Inventors: Carroll Philip Gossett, Mountain View, CA (US); Derek Bosch, Mountain View, CA (US); Shouchern Alex Yen, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/081,073

(22) Filed: May 19, 1998

(51) Int. Cl.$^7$ .................................................. G06T 17/00

(52) U.S. Cl. ............................ 345/441; 345/431; 345/4

(58) Field of Search .................................. 345/418, 419, 345/440, 441, 431

(56) References Cited

U.S. PATENT DOCUMENTS

| 5,287,438 A | 2/1994 | Kelleher ...................... 395/132 |
| 5,333,250 A | 7/1994 | Staley, II et al. ........... 395/143 |
| 5,528,738 A | 6/1996 | Sfarti et al. ................. 395/143 |
| 5,684,939 A | 11/1997 | Foran et al. ................. 395/131 |

*Primary Examiner*—Cliff N. Vo
(74) *Attorney, Agent, or Firm*—Woodcock Washburn LLP (57) ABSTRACT

A novel technique and apparatus for antialiasing in a computer graphics system is presented. The invention provides antialiasing by gamma corrected area calculation wherein the pixel coverage area is efficiently determined using cross products of the end points of line edges and the corners of the pixels. Gamma correction is advantageously achieved using linear interpolation of a Bézier curve representation of the gamma correction curve by application of the de Casteljau algorithm to programmable coefficients. The invention further provides for alpha blending of the gamma corrected area calculation for each pixel and adjustment of the area calculation for pixels with end points.

22 Claims, 6 Drawing Sheets

METHOD AND APPARATUS FOR ANTIALIASING BY GAMMA CORRECTED AREA CALCULATION

FIELD OF THE INVENTION

The invention relates generally to display of video data in a computer system. More particularly, the invention relates to antialiasing of lines and/or points in a graphics display by gamma correction based on pixel area calculation.

BACKGROUND OF THE INVENTION

Graphical images are represented in typical computer systems by individual points on a computer monitor known as pixels. There are typically thousands or several million pixels in a single computer display that are individually manipulated to form the two-dimensional and three-dimensional images which a user sees on the computer screen.

Each pixel is displayed at a specified intensity, with the intensity of each color component (e.g., red, green, and blue) pixel in a color system separately specified in accordance with the color model for the system. In monochrome systems, the pixel intensity is determined from the gray scale value of the pixel. In a typical computer graphics system, video driver circuitry specifies a voltage for each pixel displayed (or color component pixel in the case of RGB color systems). However, there is not a direct linear mapping between driver voltage levels and pixel intensity. Monitor response is nonlinear and a power law gamma correction curve describes the parametric relationship between the applied voltage (to the electron-gun or pixel driver) and the displayed pixel intensity. The calculation by which the applied voltage needed to display a particular intensity is determined is known as gamma correction of intensity. The precise value of the gamma parameter is monitor dependent and typically varies from 2.0 to 3.0, although the National Television System Committee (NTSC) has defined a signal standard value of 2.2. The shape of the correction curve depends, in part, on the gamma parameter value.

In typical computer graphics systems, the driver voltages associated with predetermined pixel intensity values are stored in lookup tables, the number of entries in the lookup table ideally equaling the possible number of pixel intensity values. In order to determine the voltage output level required to achieve a desired pixel (or sub-pixel) intensity, the table entry corresponding to that intensity level is looked up and the value therein applied to the driver circuitry.

In a computer graphics system, a line segment (which may be, but is not necessarily, a polygon boundary) has both length and width. Each line segment is bounded by two edges, the distance between the edges being the width of the line segment, and each edge is bounded by two endpoints, one at either end of each line segment edge. Similarly, although pixels are often thought of as points, each pixel has finite boundaries and a defined area. In a typical computer system with square pixels, the pixel boundaries are the top, bottom, and sides of the pixel and the area is equal to the height times the width (i.e., length of a side boundary times the length of a top or bottom boundary). If the pixel dimensions are normalized, then each pixel boundary has a length of one and the magnitude of the area of each pixel is advantageously one.

Because the pixels in a computer graphics system are arranged in a rectangular grid, and are typically rectangular, purely vertical and horizontal lines (or line segments) and boundaries are generally displayed relatively precisely and with little distortion. However, lines that are not oriented at right angles are not neatly mapped onto adjacent pixels and undesirable distortions and artifacts can occur because of the imperfect mapping between diagonal lines and/or boundaries and pixels forming the display. Moreover, the edges of lines and/or polygons often do not map to precisely defined locations on the pixel boundaries, such as when the edge is not parallel to a horizontal or vertical axis, which may further distort the displayed image.

In particular, a form of distortion colloquially referred to as "jaggies" may occur because of the stair-stepping effect which can be seen when a diagonal line is represented by a series of diagonally adjacent pixels. This stair-stepping effect can be ameliorated by effectively blurring the pixels at the edge of a line.

Numerous techniques are known in the art for "blurring" the pixels, such as varying the intensity of certain pixels based on, for example, the percentage of pixel area covered by the line. However, many of the prior art techniques tend to be computationally complex, using complex filters and/or supersampling of pixels. Other prior art techniques reduced the need for extensive computations by using table look ups for antialiasing, at the cost of limiting adaptability (if the table entries were fixed) and necessarily requiring the implementation of unwieldy tables. Moreover, many of the prior art techniques are not readily scalable for wide lines of varying width as the computations quickly become impracticable given the performance constraints typically imposed.

Furthermore, lengthy tables can undesirably constrain the flexibility of a graphics system as table entries are typically predetermined and not readily modified, making it difficult for the graphics system to efficiently support multiple monitors and/or types of monitors that are unlikely to have identical operating characteristics.

SUMMARY OF THE INVENTION

In view of the foregoing, there is a need for a technique for antialiasing that is computationally efficient, does not require extensive tables, and is readily scalable.

The present invention provides an improved technique for antialiasing by gamma correction of pixel intensity of covered pixels wherein the pre-gamma corrected intensity is relative to the amount of the pixel covered by a line as determined from the intersections of the edges of a line and pixel boundaries. By applying gamma correction to a single pixel by linear interpolation on a cubic representation of a normalized gamma correction curve, the present invention does not require a lengthy lookup table. Moreover, the present invention is readily adaptable for operation with a variety of displays with differing gamma correction characteristics.

In an alternative embodiment of the present invention, line antialiasing is further enhanced by alpha-blending the line pixel with the background. In a second alternative embodiment of the present invention, the endpoints of antialiased line segments are evaluated appropriately by accurately assessing the amount of pixel area covered and varying the pixel intensity accordingly.

DETAILED DESCRIPTION

Figure 1A:
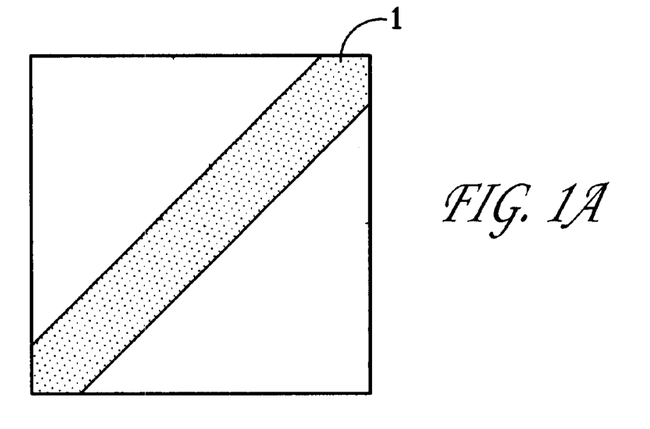
FIG. 1A is an illustration of a diagonal line segment.
Figure 1B:
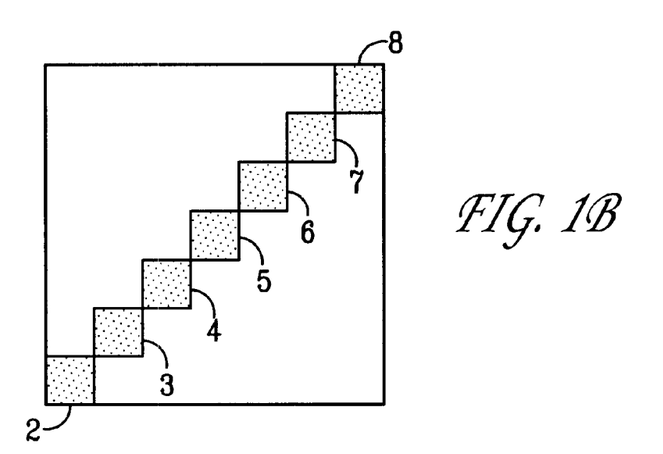
FIG. 1B is an illustration of a pixel representation of a diagonal line segment.
Figure 1C:
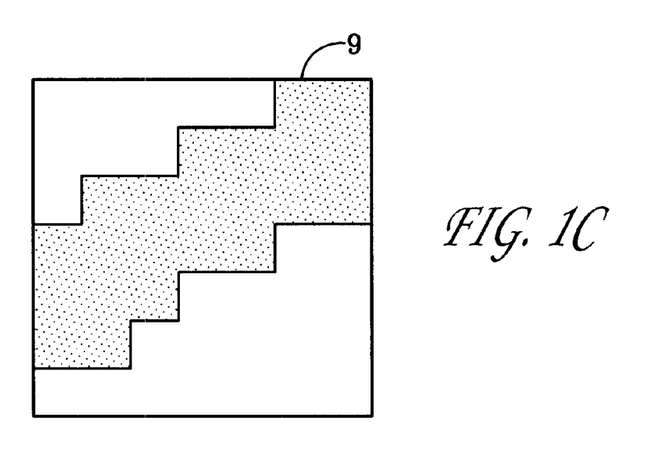
FIG. 1C is an illustration of a pixel representation of a wide line segment.

A novel method and apparatus for line antialiasing by gamma-corrected area calculation in a computer graphics system is described herein. Line antialiasing is desirable in a raster-scan computer graphics system where objects and lines are represented by a set of discrete points on horizontal scan lines on the screen. Referring to FIG. 1A, a diagonal line 1 that is not pixelated is shown. Unlike a representation of the diagonal line on a computer display, the edges of the line are smooth and continuous, without any abrupt vertical or horizontal steps. Referring to FIG. 1B, a 45° line on a pixelated display is shown. In contrast to the line of FIG. 1A, the line is represented by a series of rectangular non-adjacent pixels 2–8. The two edges of the line are not smooth diagonal surfaces, rather they are formed by a series of horizontal and vertical pixel boundaries, creating an undesirable staircase effect. Referring to FIG. 1C, the staircase effect is shown on a relatively wide line 9 at an angle of approximately 30°. In a line that is more than one pixel wide, the pixels that are bounded by edge pixels and are inside the line are not antialiased.

In the present invention, antialiasing is accomplished by varying the pixel intensity in relation to the amount of pixel area covered by the line segment. Although calculating the area of pixel coverage typically requires extensive computations, the present invention provides an improved technique by which the pixel coverage area may be computed using arithmetic, cross products and limited division.

Because of the non-linearity of the gamma correction curve and the logarithmic nature of human perception of intensity, incrementally changing the pixel intensity cannot be accurately achieved by direct linear mapping of a change in pixel intensity to the change in driver voltage (e.g., reducing the driver voltage by 30% will not necessarily reduce associated pixel (or sub-pixel) intensity by 30%). Therefore, it is necessary to evaluate the gamma correction curve at the desired pixel intensity to determine the output level needed to achieve the desired intensity. In the present invention, the gamma correction curve is characterized as a cubic spline and the desired output level is determined by linear interpolation applying the de Casteljau algorithm, eliminating the need for extensive storage and/or transfer of gamma correction curve tables.

In an embodiment of the present invention, the pixel color attributable to the antialiased line segment is alpha blended with the background color where the degree of alpha blending is proportional to area of pixel coverage.

Figure 2:
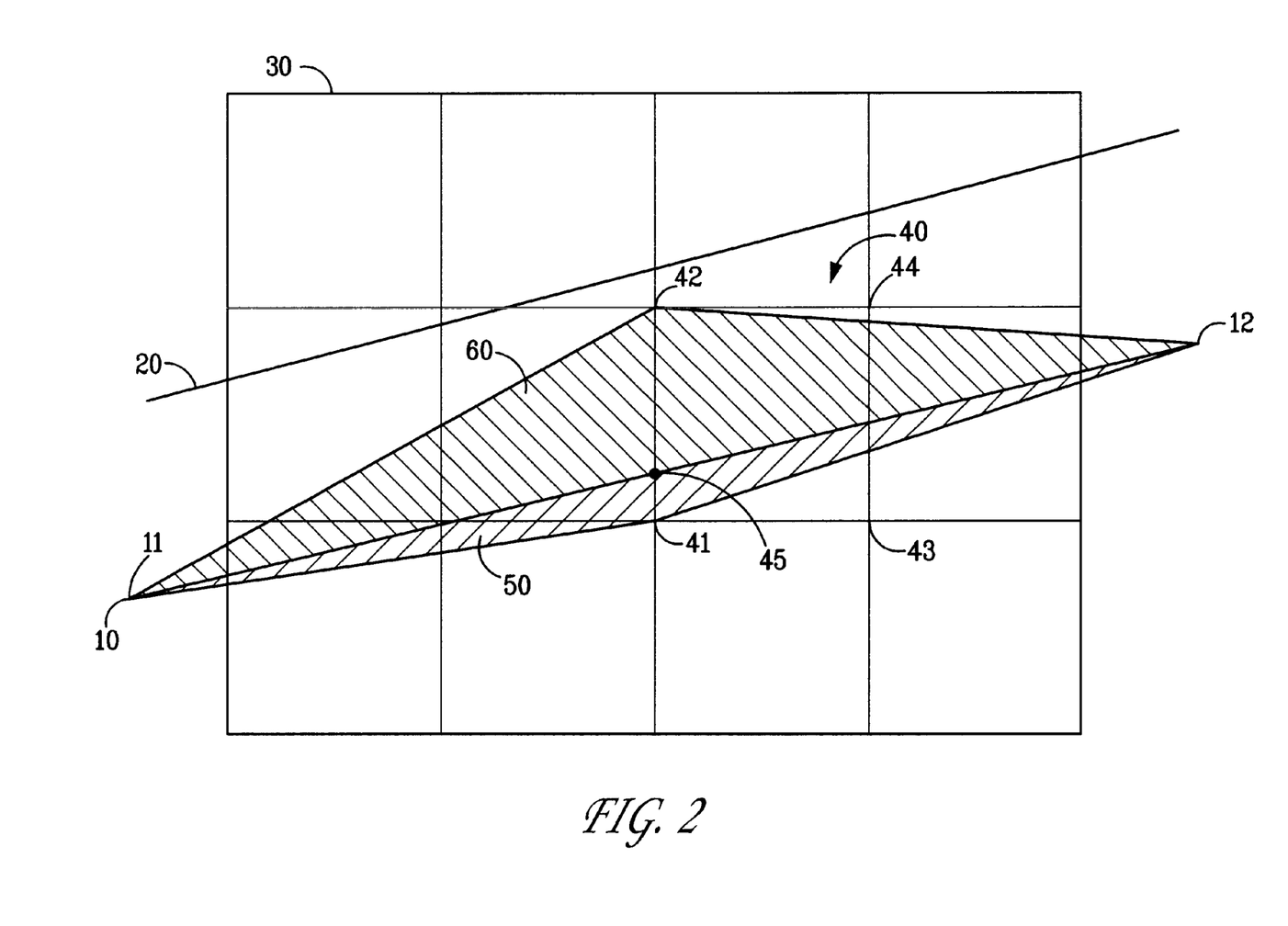
FIG. 2 is an illustration of a line segment partially covering a plurality of pixels and triangles used to identify the point of interception between an edge of the line segment and a pixel boundary.

Referring to FIG. 2, a line segment with a first edge 10 and a second edge 20 is shown crossing a plurality of pixels 30, including pixel 40. Pixel 40 has four corners 41, 42, 43 and 44; and four boundaries corresponding to the sides of pixel 40 connecting the four corners (i.e., the four line segments from 41 to 42, from 42 to 44, from 41 to 43, and from 43 to 44).

In accordance with the present invention, each pixel intersected by an edge of the line segment is antialiased by changing the pixel intensity by an amount proportional to the area of the pixel covered by the line segment. Determination of the area of pixel coverage is a multiple step process which may be advantageously performed using line equations generated to draw the line segment and accordingly do not need to be computed separately solely for determination of pixel coverage.

The area of the pixel covered by a line segment may be readily determined from the intersection points of the line segment edges and the pixel boundaries. These intersection points may, in turn, be advantageously determined from the triangles formed between the edges and each of the four pixel corners. Referring to FIG. 2, the edge 10 intersects a vertical boundary of pixel 40 at point 45. All the corners of pixel 40 are known, including the lower left corner 41 and upper left corner 42.

Figure 3:
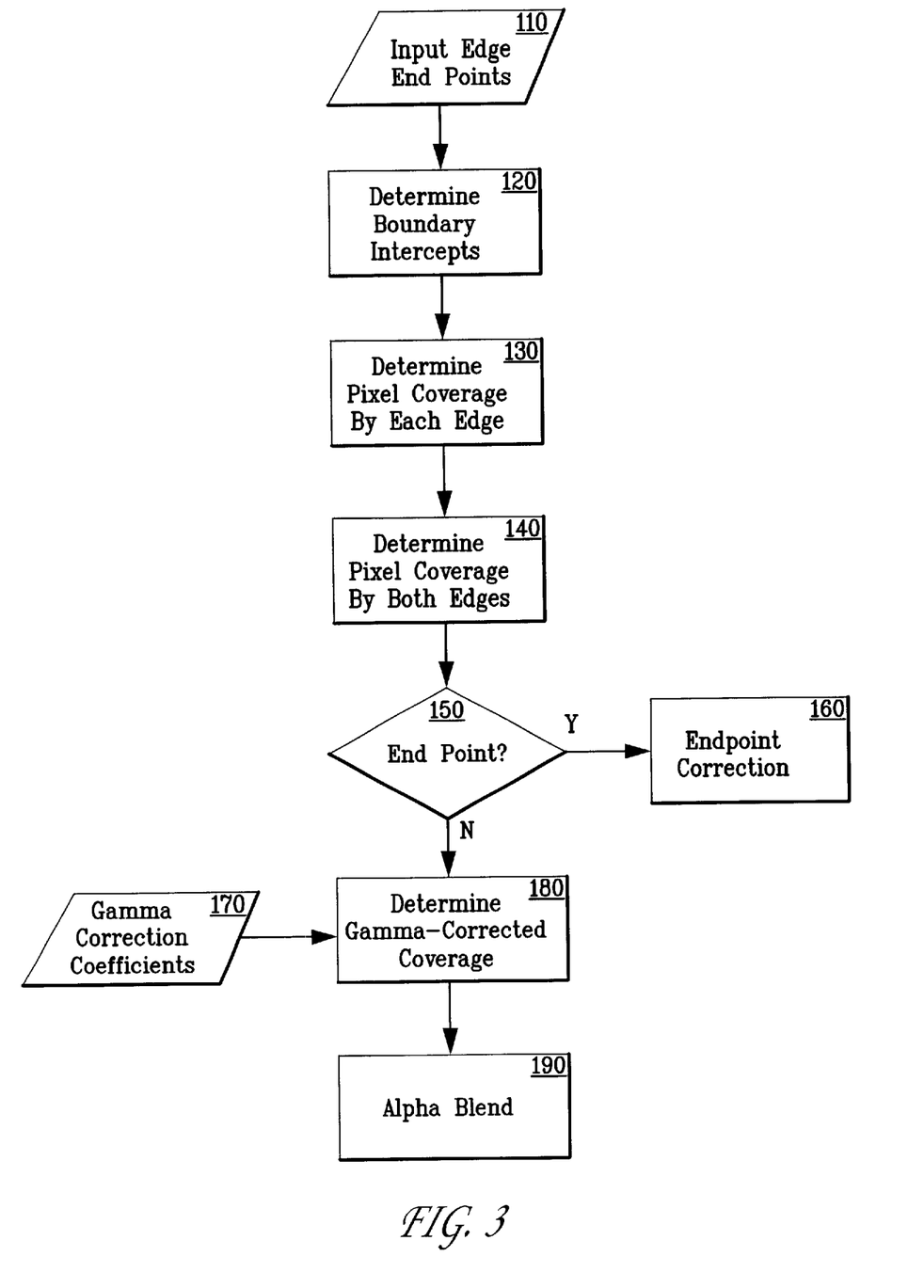
FIG. 3 is a flowchart representation of a method of antialiasing in accordance with an embodiment of the present invention.

Referring to FIG. 3, the edge end points, which are needed for the line equations defining the line segment edges irrespective of antialiasing, are made available to the antialiasing subsystem or algorithm as shown by input/output block 110. Referring again to FIG. 2, the end points 11 and 12 of line segment edge 10 are therefore known. As the area of a triangle formed by three known points can be readily determined using basic geometry, the areas of the eight triangles formed by the end points of the line segment edges 10 and 20 and the four corners of pixel 40 are readily calculated using addition, subtraction, multiplication and binary division.

Referring again to FIG. 2, triangle 50 is formed by the end points 11 and 12 and pixel corner 41. In a similar manner, triangle 60 is formed by the endpoints 11 and 12 and pixel corner 42. The location of the edge intercept 45 on the pixel boundary between pixel corners 41 and 42 is determined from the ratio of the triangle areas. This process is simultaneously or sequentially performed for each edge and each pixel boundary as indicated by processing block 120 of FIG. 3.

The three vertices of the triangle and the triangle ratio are also used to determine whether an edge intersects a pixel boundary and, if so, which of the pixel corners are inside the line segment (or polygon) of which the edge is a part. When the area of a triangle is determined from the three vertices using analytic geometry, the result is signed, as shown by equation 1 below $$\frac{1}{2}\begin{vmatrix} x_a & y_a & 1 \\ x_b & y_b & 1 \\ x_c & y_c & 1 \end{vmatrix} = \frac{1}{2}(x_a y_b + x_b y_c + x_c y_a - y_a x_b - y_b x_c - y_c x_a) \quad (1)$$

where $x_\alpha$ and $y_\alpha$ are the x and y coordinates of vertices a, b, and c of the triangle.

In an embodiment of the present invention, the distance from the edge to the pixel corner, which is proportional to the triangle area, may be determined from the signed magnitude of the cross product as shown in equation 2 below $$(x_a - x_c)(y_b - y_c) - (x_b - x_c)(y_a - y_c) \quad (2)$$

where $x_\alpha$ and $y_\alpha$ are the x and y coordinates of vertices a, b, and c of the triangle formed by the two endpoints of the edge and the pixel corner.

Referring again to FIG. 2, the areas of triangles 50 and 60 have different signs. The sign of the triangle formed by the edge and the pixel corner indicates whether the pixel corner is covered by the line segment or lies outside of the line segment. For each line segment edge, triangles with vertices formed by covered pixel corners will have one sign and triangles with vertices formed by pixel corners that are not covered by the line segment will have the opposite sign.

In an embodiment of the present invention, a four bit field is associated with each edge of a line segment and each bit of the field is associated with a pixel corner. As each triangle is evaluated, the bit associated with the corner forming a vertex of the triangle may be set (or cleared) to indicate that the pixel is covered. The four bit field can then be readily evaluated (by, for example, masking using logical AND operations) during pixel coverage evaluation.

The ratio between the area of a first triangle formed by end points of an edge and a pixel corner and the result of the area of the first triangle less the area of a second triangle formed by the end points of the edge and the adjacent pixel corner on the same boundary is evaluated to determine whether the edge intersects the pixel boundary between the two pixel corners. If the ratio is not within the numeric range from zero to one, the edge does not intersect the pixel boundary between the two corners. If the ratio is greater than zero and less than one, then the edge intercepts the pixel boundary at the location indicated by the ratio. For example, if the ratio is ½, then the edge bisects the pixel boundary.

Once the pixel boundary and edge intersection points have been identified, the area bounded by each edge and the pixel boundary is determined using standard analytic geometry area calculations as shown in processing block 130 of FIG. 3. If the edge crosses two adjacent pixel boundary edges and only one pixel corner is covered by the line segment, the covered pixel region is a triangle and the area is computed from the base and height of the covered triangle region wherein the base and height are determined from the intersection points. If the edge crosses two adjacent pixel boundary edges and three pixel corners are covered by the line segment, then the covered pixel region is equal to the total pixel area less the area of the triangle formed by the edge and the uncovered pixel corner. The area of this triangle is readily determined from the base and height of the covered triangle region wherein the base and height are determined from the intersection points. If the edge crosses two opposite edges of the pixel boundary, then the covered area is equal to the area of a rectangle with one dimension equal to the length of a pixel boundary and the second dimension equal to the average of the distances from the included pixel boundary to the two pixel boundary edge intersection points.

Having separately determined the pixel coverage attributable to each edge, the total pixel coverage is determined by summing the pixel coverage attributable to each edge and subtracting the area of a pixel from the sum as shown by processing block 140 of FIG. 3. In an embodiment of the present invention where the pixel area is normalized, one is subtracted from the sum of the two pixel coverage areas attributable to each edge and the result is the total pixel area covered by the line segment.

A line segment that is being evaluated for antialiasing that does not extend beyond the display boundaries will include endpoints within pixels. In order to accurately antialias a pixel enclosing an edge endpoint, it is desirable to adjust the pixel coverage determination to reflect that the edge does not extend across the entire pixel. Therefore, as shown by decision block 150 of FIG. 3, a determination is made as to whether the pixel includes an endpoint. If the pixel does include an endpoint, the pixel area determination is corrected to compensate for the reduced pixel coverage as shown by processing block 160. In an embodiment of the present invention, the evaluated pixel coverage is treated as being linear across the pixel and is adjusted by a factor related to the actual end point location in the pixel. The calculated pixel coverage area is reduced in proportion to the extent to which the edge extends into the pixel. For example, if an edge ended in the middle of a pixel, the calculated pixel area coverage would be reduced by one half.

Once the pixel coverage area is determined, the gamma-corrected coverage value is determined as shown by processing block 180. The gamma corrected coverage value is determined from the gamma correction coefficients and the pixel coverage area. The gamma correction coefficients describe the gamma correction curve. In an embodiment of the present invention, the gamma correction coefficients are the control point coefficients of a cubic spline describing the gamma correction curve. Applying the de Casteljau algorithm, the point on the gamma correction curve corresponding to the desired pixel intensity as indicated by the pixel area coverage is determined by linear interpolation. This point on the gamma correction curve corresponds to the gamma corrected coverage value.

In an embodiment of the present invention, the gamma corrected coverage value is used for alpha blending as shown by processing block 190 of FIG. 3. Alpha blending is a technique for color blending that is particularly useful for rendering opaque surfaces. In alpha blending, the antialiased line pixel color (source) is blended with the color of the pixel established by background objects (destination). In an embodiment of the present invention, the alpha blended color is defined as $\alpha S+(1-\alpha)D$ where $\alpha$ is the gamma corrected coverage value, S is the source color (contributed by the antialiased line) and D is the pixel color before rendering the antialiased line.

In an alternative embodiment of the present invention, alpha blending is not used and the gamma corrected coverage value for each color component is applied directly to the display circuitry and the pixel (or sub-pixel) intensity corresponds directly to the gamma corrected coverage value.

Figure 4:
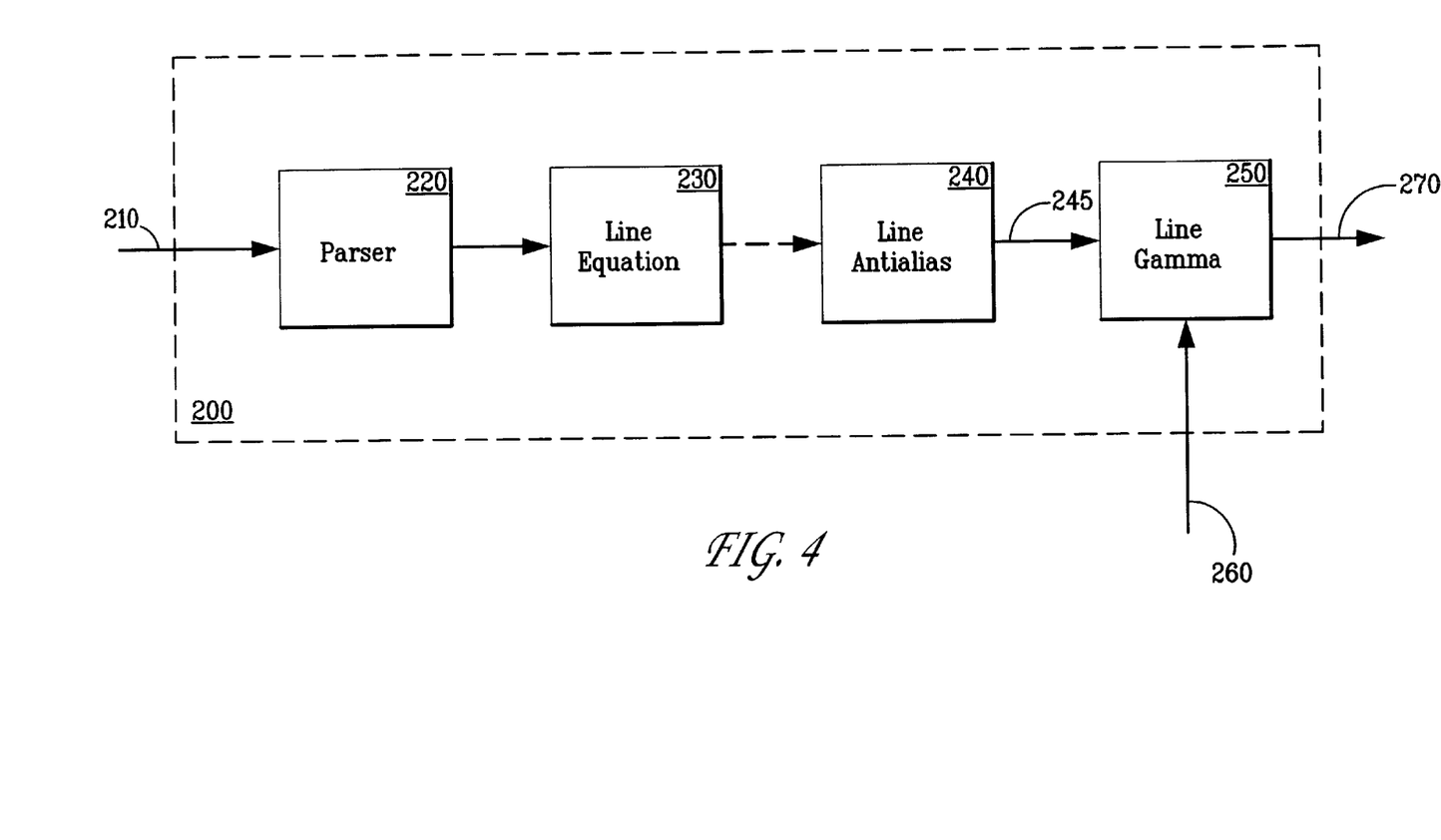
FIG. 4 is a block diagram representation of a partial rasterizing engine illustrating elements used for antialiasing in accordance with an embodiment of the present invention.

A block diagram of a partial rasterizing engine illustrating elements used for antialiasing in accordance with an embodiment of the present invention is shown in FIG. 4. In the illustrated embodiment, the rasterizing engine receives instructions 210 (primarily graphical output primitives) from a transform engine (not shown). The received instructions are processed by parser 220 which transfers parsed instructions for drawing lines to line equation processor 230. The line equation processor 230 generates the line equations used to draw lines on a display. These line equations are evaluated to generate raster lines on the display, including identification of pixels covered by each generated raster line.

Figure 5:
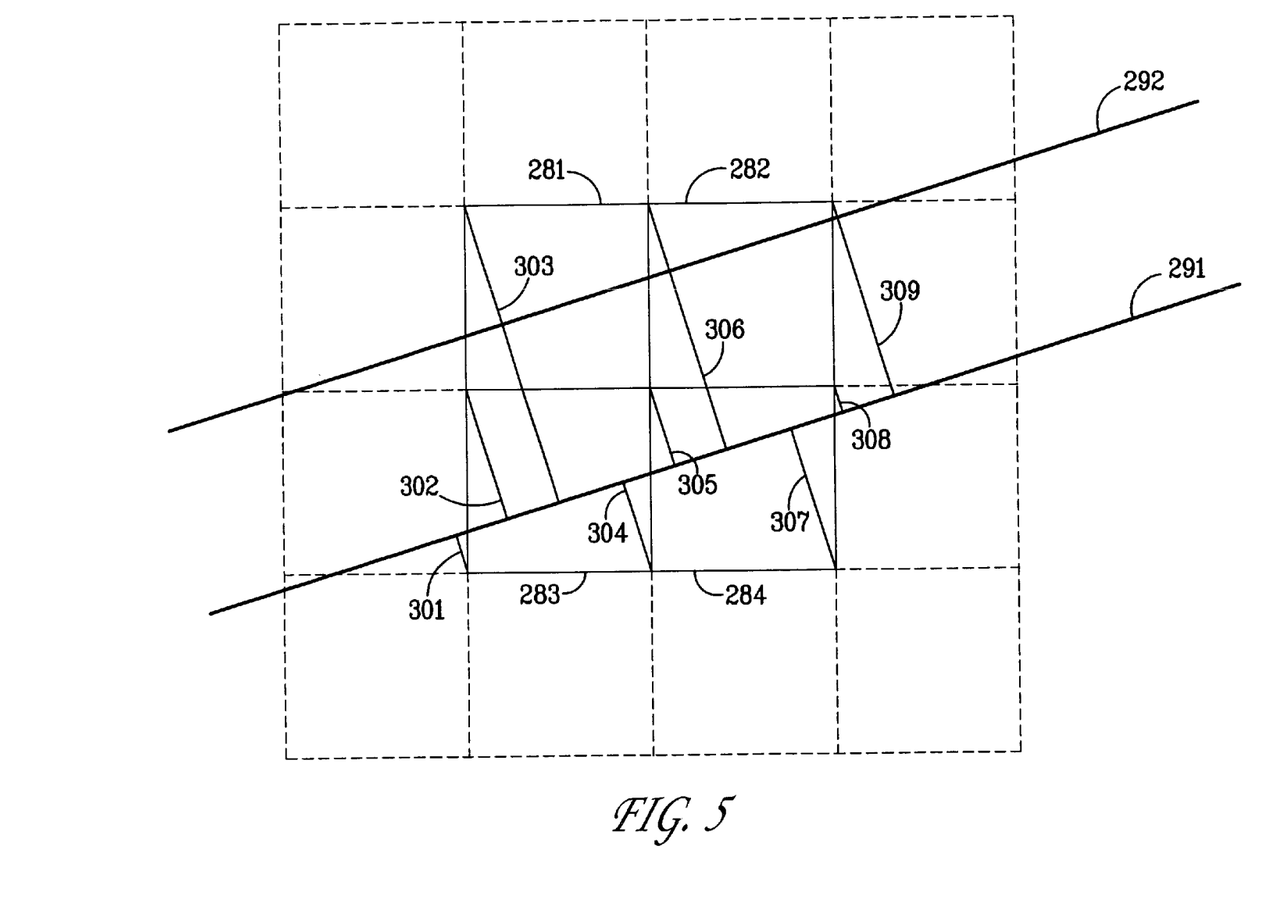
FIG. 5 is an illustration of a line segment and a quad of pixels.

Once the line equations have been evaluated, each pixel is evaluated to determine how much of the pixel area is covered by the line segment in line antialias block 240. In an embodiment of the present invention in which pixels are evaluated in quads of four adjacent pixels, each edge is input to line antialias block 240 separately, and the input data include nine signed distances (one for each pixel corner in the quad) and an in sign status flag, indicating whether, relative to the edge being analyzed, a positive distance or a negative distance is in the line segment. Referring to FIG. 5, a quad of four pixels, 281, 282, 283, and 284 and a line segment with edges 291 and 292 are shown. Nine distance vectors 301, 302, 303, 304, 305, 306, 307, 308, and 309, from edge 291 to the nine corners of the quad are shown. Distance vectors 302, 303, 305, 306, 308 and 309 have the same sign and this sign is the in sign. Distance vectors 301, 304, and 307 have the opposite sign.

In an embodiment of the present invention, the signed distances are the signed magnitudes of the cross products of the edge end points and the pixel corners as defined in equation 2 above. In an alternative embodiment of the present invention in which only one pixel is processed at a time, only four signed distances (and an in sign flag) would be input to the line antialias block 240 for each edge.

Figure 6:
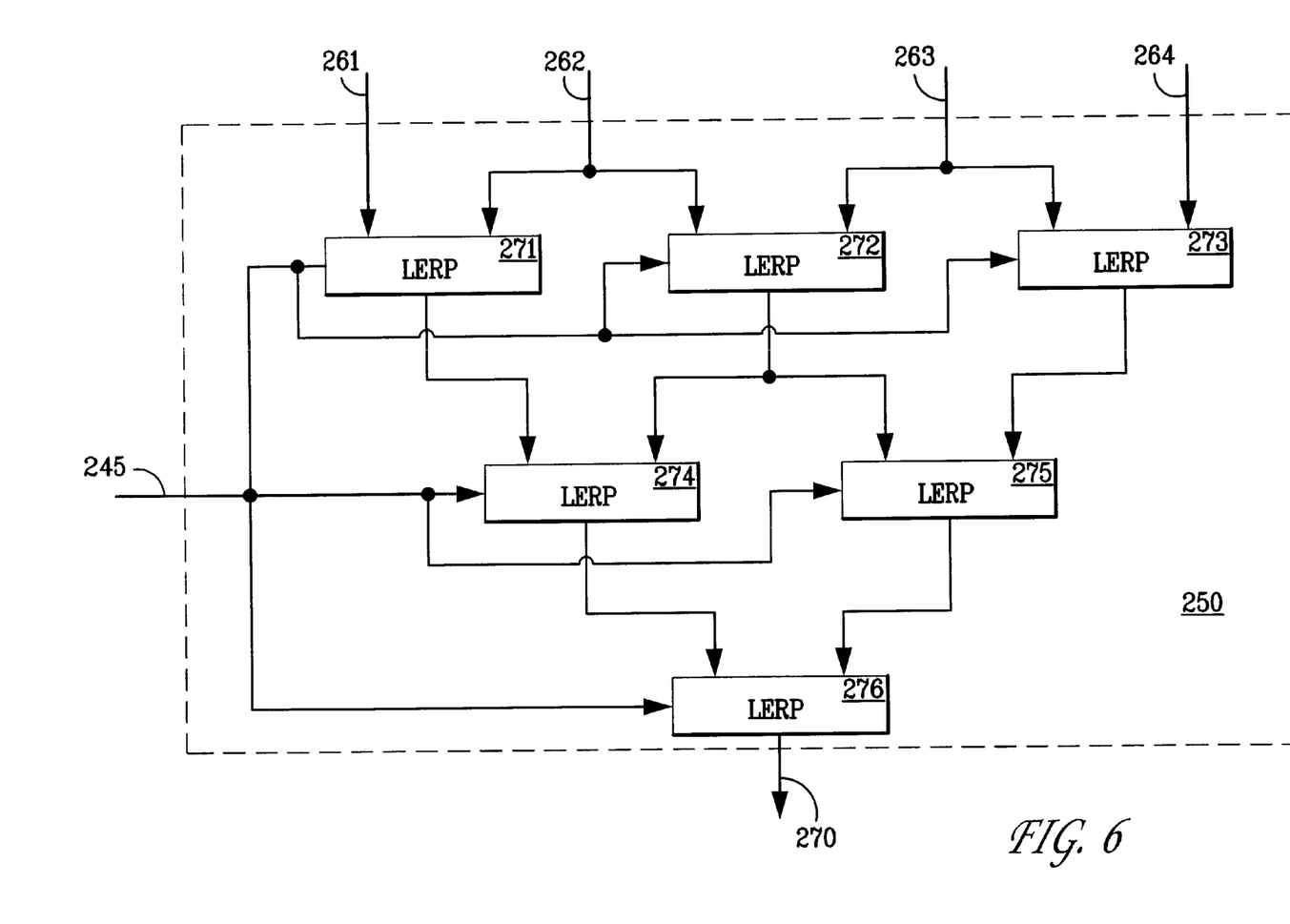
FIG. 6 is a block diagram of a line gamma correction block in a rasterizing engine in accordance with an embodiment of the present invention.

The line antialias block outputs an endpoint corrected pixel area coverage value 245 for each pixel. The endpoint corrected pixel area coverage values are input into line gamma correction block 250. The line gamma correction block 250 also receives programmable coefficients 260 as inputs. Referring to FIG. 6, in an embodiment of the present invention, the programmable coefficients are cubic spline control points describing the gamma correction curve for the display associated with the computer graphics system. Preferably, the cubic spline approximation of the gamma correction curve is a Bézier curve.

The line gamma correction block implements the de Casteljau algorithm in which the point on a Bézier curve with a specified parameter may be determined by successive linear interpolations. In the illustrated embodiment of the present invention, the parameter is the endpoint corrected pixel area coverage value 245 and the Bézier curve is an approximation of the gamma correction curve.

As shown in FIG. 6, four Bézier curve control points, 261, 262, 263, and 264, are input into three linear interpolation blocks 271, 272, and 273 of line gamma correction block 250. The endpoint corrected pixel area coverage value 245 is the interpolation coefficient input into each of the linear interpolation blocks 271, 272, and 273. The linear interpolation block 271 outputs an interpolated result between control points 261 and 262 which is input to linear interpolation block 274. Similarly, linear interpolation block 272 outputs an interpolated result between control points 262 and 263 which is input into linear interpolation blocks 274 and 275 and linear interpolation block 273 outputs an interpolated result between control points 263 and 264 which is input into linear interpolation block 275. Linear interpolation blocks 274 and 275 also receive an interpolation coefficient from endpoint corrected pixel area coverage value 245 and each output a result interpolated between their respective inputs. The outputs of linear interpolation blocks 274 and 275 are input into linear interpolation block 276 which similarly receives an interpolation coefficient input of the endpoint corrected pixel area coverage value 245 and outputs a gamma corrected coverage value 270 which corresponds to the point on the gamma correction curve for the desired pixel (or sub pixel) intensity.

The gamma corrected coverage value 270 may be used as an input for alpha blending as described above or, alternatively, stored directly in a frame buffer.

Accordingly, a method and apparatus for antialiasing by gamma corrected pixel area calculation is disclosed in which pixel area coverage is advantageously computed without supersampling or requiring extensive computations that are difficult to efficiently implement in a computer system and gamma correction is readily and flexibly implemented without requiring unwieldy table operations.

Although various embodiments are specifically illustrated and described herein, it will be appreciated that modifications and variations of the present invention are covered by the above teachings and within the purview of the appended claims without departing from the spirit and intended scope of the invention. For example, the present invention is not limited to line antialiasing and is readily applicable to antialiasing of any polygon edge.

What is claimed is:

1. A method of antialiasing a pixel partially covered by a line segment having first and second edges in a computer graphics system having a display comprised of a plurality of pixels having a boundary, said method comprising:

determining a first area of pixel coverage by the line segment extending from said first edge;

determining a second area of pixel coverage by the line segment extending from said second edge;

determining a total area of pixel coverage from said first and second areas of pixel coverage; and determining a gamma corrected value from said total area of pixel coverage.

2. The method of antialiasing a pixel of claim 1 wherein said pixel is associated with a color component.

3. The method of antialiasing a pixel of claim 1 wherein said gamma corrected value is associated with the intensity of the pixel in the display.

4. The method of antialiasing a pixel of claim 1 wherein said pixel is associated with a color and said method further comprises alpha blending said pixel.

5. The method of antialiasing a pixel of claim 4 wherein the pixel is alpha blended in accordance with the formula: $\alpha S+(1-\alpha)D$, where $\alpha$ is the gamma corrected value, S is the color of the line segment, and D is the color of the pixel before being partially covered by said line segment.

6. The method of antialiasing a pixel of claim 1 wherein said step of determining a first area of pixel coverage by the line segment extending from said first edge comprises:

determining where said first edge intersects said pixel boundary;

determining the direction of said line segment relative to said first edge; and determining a first area of said pixel between said first edge and said pixel boundary in the direction of said line segment.

7. The method of antialiasing a pixel of claim 1 wherein said step of determining a second area of pixel coverage by the line segment extending from said second edge comprises:

determining where said second edge intersects said pixel boundary;

determining the direction of said line segment relative to said second edge; and determining a second area of said pixel between said second edge and said pixel boundary in the direction of said line segment.

8. The method of antialiasing a pixel of claim 7 wherein said step of determining a total area of pixel coverage from said first and second areas of pixel coverage comprises adding said first and second areas of said pixel and subtracting the area of a pixel.

9. The method of antialiasing a pixel of claim 1 wherein said pixel has unit dimensions and said step of determining a gamma corrected value from said total area of pixel coverage comprises evaluation of a polynomial expression of a gamma correction curve.

10. The method of antialiasing a pixel of claim 9 wherein said gamma correction curve is expressed by a cubic spline.

11. The method of antialiasing a pixel of claim 9 wherein said gamma correction curve is expressed by a Bézier curve.

12. The method of antialiasing a pixel of claim 9 wherein said evaluation of a polynomial expression of a gamma correction curve comprises successive linear interpolations.

13. The method of antialiasing a pixel of claim 9 wherein said evaluation of a polynomial expression of a gamma correction curve comprises application of the de Casteljau algorithm to the control points of a Bézier curve.

14. The method of antialiasing a pixel of claim 13 wherein said pixel is associated with a color, said method further comprising alpha blending said pixel.

15. The method of antialiasing a pixel of claim 14 wherein the pixel is alpha blended in accordance with the formula: $\alpha S+(1-\alpha)D$, where $\alpha$ is the gamma corrected value, S is the color of the line segment, and D is the color of the pixel before being partially covered by said line segment.

16. The method of antialiasing a pixel of claim 6 wherein said pixel has corners and said edges have end points, said step of determining where said first edge intersects said pixel boundary comprising:

determining the area of a first triangle formed by a first pixel corner and the end points of said first edge;

determining the area of a second triangle formed by a second pixel corner and the end points of said first edge; and evaluating a proportional relationship between said first triangle area and said second triangle area.

17. The method of antialiasing a pixel of claim 16 wherein said step of evaluating a proportional relationship between said first triangle area and said second triangle area comprises division of said first triangle area by the result of said first triangle area minus said second triangle area.

18. The method of antialiasing a pixel of claim 16 wherein said step of determining the area of a first triangle formed by a first pixel corner and the end points of said first edge comprises evaluation of the cross product of vectors formed by said first pixel corner and said first edge end points.

19. The method of antialiasing a pixel of claim 7 wherein said pixel has corners and said edges have end points, said step of determining where said second edge intersects said pixel boundary comprising:

determining the area of a first triangle formed by a first pixel corner and the end points of said second edge;

determining the area of a next triangle formed by a next pixel corner and the end points of said second edge; and evaluating a proportional relationship between said first triangle area and said next triangle area.

20. The method of antialiasing a pixel of claim of claim 6 wherein said step of determining a first area of pixel coverage by the line segment extending from said first edge further comprises determining the extent to which said first edge extends into said pixel.

21. The method of antialiasing a pixel of claim 7 wherein said step of determining a second area of pixel coverage by the line segment extending from said second edge further comprises determining the extent to which said second edge extends into said pixel.

22. A system for antialiasing a pixel partially covered by a line segment having first and second edges, in a computer graphics system having a display comprised of a plurality of pixels having a boundary, said system comprising:

first area determining logic for determining a first area of pixel coverage by the line segment extending from the first edge;

second area determining logic for determining a second area of pixel coverage by the line segment extending from the second edge;

total area determining logic for determining a total area of pixel coverage from the first and second areas of pixel coverage; and value determining logic for determining a gamma corrected value from said total area of pixel coverage.

* * * * *